(12) United States Patent
Axmon et al.

(10) Patent No.: US 7,983,197 B2
(45) Date of Patent: Jul. 19, 2011

(54) SYSTEM AND METHOD FOR ROBUST CELL DETECTION

(75) Inventors: Joakim Axmon, Kävlinge (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 12/399,809

(22) Filed: Mar. 6, 2009

(65) Prior Publication Data

US 2010/0226264 A1    Sep. 9, 2010

(51) Int. Cl.
*H04L 12/28* (2006.01)
*H04Q 7/00* (2006.01)

(52) U.S. Cl. .................................. 370/255; 370/328

(58) Field of Classification Search .......... 370/252, 370/254, 255, 328, 350, 497, 503
See application file for complete search history.

(56) References Cited

U.S. PATENT DOCUMENTS

| | | | |
|---|---|---|---|
| 6,996,162 B1 | 2/2006 | Hosur et al. | |
| 7,065,064 B2 | 6/2006 | Chitrapu | |
| 7,224,718 B2 | 5/2007 | Chang et al. | |
| 7,415,084 B2 | 8/2008 | Pietraski et al. | |
| 7,729,315 B2 * | 6/2010 | Lindoff et al. | 370/332 |
| 2003/0117979 A1 | 6/2003 | Chitrapu | |
| 2003/0117996 A1 * | 6/2003 | Lim et al. | 370/350 |
| 2003/0179708 A1 * | 9/2003 | Kamerman et al. | 370/241 |
| 2004/0058650 A1 * | 3/2004 | Palenius et al. | 455/67.11 |
| 2006/0182168 A1 | 8/2006 | Wang et al. | |
| 2007/0248068 A1 * | 10/2007 | Onggosanusi et al. | 370/338 |

OTHER PUBLICATIONS

3GPP TS 36.211, "3rd Generation Partnership project; Technical Specification Group Radio Access Network; Evolved Universal Terrestrial Radio Access (E-UTRA); Physical Channels and Modulation (Release 8)", V8.4.0, Section 6.11. Sep. 2008. 3rd Generation Partnership Project (3GPP), Valbonne, France.

3GPP TS 36.101, "3rd Generation Partnership project; Technical Specification Group Radio Access Network; Evolved Universal Terrestrial Radio Access (E-UTRA); User Equipment (UE) radio transmission and reception (Release 8)", V8.3.0, Section 5.2. Sep. 2008. 3rd Generation Partnership Project (3GPP), Valbonne, France.

* cited by examiner

*Primary Examiner* — Hong Cho
(74) *Attorney, Agent, or Firm* — Coats & Bennett, P.L.L.C.

(57) ABSTRACT

A wireless communication receiver performs robust cell searching, excluding interference due to UL transmissions from other UE, by qualifying the output of a matched filter with a metric indicative of the momentary signal-to-noise ratio (SNR). The momentary SNR metric is derived over the same amount of samples as the length of the matched filter. By discarding filter outputs during low momentary SNR, synchronization interference from UL transmissions is avoided. The momentary SNR metric and filter outputs are efficiently calculated, with only a few states and operations, compared to a conventional tapped delay line filter implementation. A limited list of cell candidates is populated, with information on correlation, timing, cell identity within cell group, and SNR metric for the K strongest candidates with respect to the matched filter correlation values. This list is used for later cell search stages, where a secondary synchronization channel is decoded.

19 Claims, 5 Drawing Sheets

SYSTEM AND METHOD FOR ROBUST CELL DETECTION

TECHNICAL FIELD

The present invention relates generally to wireless communication systems, and in particular to a method and apparatus for robust cell detection by a receiver.

BACKGROUND

Many types of cellular wireless communication systems are known in the art. When a mobile station, or user equipment (UE), powers up, it is unaware of which cell, or even system, in which it is operating. The UE initiates a search of predetermined frequencies, searching for known synchronization signals. Once the synchronization signals are found and decoded, the UE searches for a control channel and downloads system- and cell-specific information.

The Universal Mobile Telecommunications System (UMTS) is a third-generation (3G) wireless communication technology. The UMTS access network is the UMTS Terrestrial Radio Access Network (UTRAN). Long Term Evolution (LTE) is an evolution of UMTS. The access network in LTE is called Evolved UTRAN (E-UTRAN). E-UTRAN will operate over a very wide span of operating bandwidths and carrier frequencies, in both Frequency Division Duplex (FDD) and Time Division Duplex (TDD) systems. The LTE air interface utilizes Orthogonal Frequency Division Multiple Access (OFDMA) in the downlink and Single-Carrier FDMA (SC-FDMA) in the uplink. LTE systems are anticipated to operate from micro cells up to macro cells with 100 km cell range. The OFDMA radio access technology adapts well to a variety of different propagation conditions, as will be required to handle the different radio conditions that may occur in LTE systems.

To facilitate the cell searching function necessary for mobile UE, two synchronization signals are transmitted periodically every 5 ms in a cell: a primary synchronization signal (P-SCH) and a secondary (S-SCH). The synchronization signals carry information on the physical layer cell identity, a unique (in a wide geographical area) identity of the cell.

Three versions are defined for the P-SCH, one for each of three cell identities within one out of 504 groups of cells. The three versions of P-SCH are common to all cell groups. Since there are only three versions, the straight-forward, prior art approach to P-SCH detection is to conduct matched filtering over at least 5 ms of received samples for each of the P-SCH versions, in order to identify correlation peaks that may reveal synchronization signals from one or more cells. Once a cell candidate has been found, the location of S-SCH can be hypothesized based on the position of P-SCH. Hypothesized, since the position of S-SCH differs depending on duplex mode (FDD/TDD) and cyclic prefix length.

The matched filtering approach is straight-forward to apply in case of FDD, where uplink (UL) and downlink (DL) transmissions occur on different radio channels—that is, UL and DL are separated in frequency. The case of TDD, however, presents a greater challenge, as the same radio channel is used for UL and DL. Whether a subframe is allocated for UL or DL depends on how TDD cells on that particular carrier frequency are configured. FIG. 5 depicts a TDD frame structure (the figure is taken from FIG. 4.2-1 of 3GPP Technical Specification 36.211, "$3^{rd}$ Generation Partnership project; Technical Specification Group Radio Access Network; Evolved Universal Terrestrial Radio Access (E-UTRA); Physical Channels and Modulation (Release 8)," V8.4.0, Section 6.11). A subframe in the TDD frame may be allocated to either UL or DL traffic. P-SCH is transmitted in positions marked DwPTS. Table 1 depicts the UL/DL configuration options (taken from Table 4.2-2 of the same specification), wherein U denotes UL traffic, D denotes DL traffic, and S is switched (both UL and DL).

TABLE 1

Uplink-downlink allocation on subframe basis for different configurations in TDD

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The first time a TDD carrier is visited, during initial cell search or inter-frequency cell search, the synchronization (timing) used on that particular carrier is unknown. When the UE is searching for cells, it must search over the full 5 ms interval. Some of the subframes over which the search is conducted will be allocated for UL, and others for DL. If a nearby UE transmits on its UL, this may cause interference at a receiver that is orders of magnitude larger than the signal transmitted from the network (i.e., a base station, known in E-UTRAN as an evolved Node B (eNB)).

A further complication in initial cell search is that since no signaling is available, the UE is unaware of which duplex mode to expect on a particular carrier frequency. Table 2 depicts the frequency bands that are supported in E-UTRAN, along with duplex mode(s) used in each particular band (the figure is taken from Table 5-2.1 of 3GPP Technical Specification 36.101, "$3^{rd}$ Generation Partnership project; Technical Specification Group Radio Access Network; Evolved Universal Terrestrial Radio Access (E-UTRA); User Equipment (UE) radio transmission and reception (Release 8)," V8.3.0, Section 5.2).

TABLE 2

E-UTRAN frequency bands and supported duplex modes

| E-UTRA Band | Uplink (UL) eNode B receive UE transmit $F_{UL\_low}$-$F_{UL\_high}$ | Downlink (DL) eNode B transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |

TABLE 2-continued

E-UTRAN frequency bands and supported duplex modes

| E-UTRA Band | Uplink (UL) eNode B receive UE transmit $F_{UL\_low}$-$F_{UL\_high}$ | Downlink (DL) eNode B transmit UE receive $F_{DL\_low}$-$F_{DL\_high}$ | Duplex Mode |
|---|---|---|---|
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| ... | | | |
| 17 | 704 MHz-716 MHz | 734 MHz-746 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

Note that some bands overlap, e.g., band 2 and 36, meaning that carrier frequencies within 1930-1990 MHz can be used for both FDD and TDD (although not in the same geographical area). Countermeasures against UL interference will be required by the UE whenever TDD cannot be ruled out. Otherwise, the UE may mistake other UEs for eNBs, and the cell search will fail or take a very long time.

One method of UL interference mitigation during initial cell search on a TDD carrier (initial or inter-frequency) is to estimate the interference in the filter output, and scale any correlation peak down by the interference (i.e., the correlation peak value is divided by the interference estimate). The interference is estimated in an interval spanning about half a subframe on each side of the analyzed time instant. This approach may require high complexity in terms of memory and/or computational demands, depending on implementation. For a computationally efficient implementation, large buffers are necessary to keep track of the samples entering and leaving a window for interference level estimation.

Furthermore, this approach assumes a substantial number of samples will be present, in addition to the interval over which the cell search is conducted. In initial cell search this is not a problem since the UE is not mandated to find a cell within a particular time span, and hence the UE can collect as many samples as needed. However, when conducting inter-frequency cell search the first time on a TDD carrier, the timing (synchronization) will not be known, so measures to deal with UL interference are required. At the same time, there are only a limited number of samples available in the 6 ms transmission gap. Radio frequency switching will consume parts of this gap, and in the standard, it is only assumed that an efficient gap of 5 ms will be available. Therefore, it is not possible to use a large number of samples in addition to the ones to be examined, since most of the samples are needed in the search for cells.

SUMMARY

According to one or more embodiments of the present invention, UL transmissions from other UE are excluded during cell searching by qualifying the output of a matched filter with a metric indicative of the momentary signal-to-noise ratio (SNR). A momentary SNR is one derived over the same amount of samples as the length of the matched filter. By discarding filter outputs during low momentary SNR, synchronization interference from UL transmissions is avoided. The momentary SNR metric and filter outputs are efficiently calculated, with only a few states and operations, compared to a conventional tapped delay line filter implementation. A limited list of cell candidates is populated, with information on correlation, timing, cell identity within cell group, and SNR metric for the K strongest candidates with respect to the matched filter correlation values. This list is used for later cell search stages, where a secondary synchronization channel is decoded. In one embodiment, the list is protected from being overrun by multi-path components of the same synchronization signal.

One embodiment relates to a method of wireless communication network cell detection. Synchronization signals, each including a cell identification, are received from the wireless network. A correlation metric and a momentary signal to noise ratio (SNR) metric of the received signals are determined by correlating the received synchronization signals with one or more known synchronization patterns. A list of cell candidates having the highest correlations, that also exceed a predetermined threshold SNR metric, is maintained.

Another embodiment relates to a cell identifier for a receiver in user equipment (UE) operative in a wireless communication network. The cell identifier includes a matched filter operative to receive digitized samples of received synchronization signals, and operative to output a correlation metric indicative of the correlation between the signal samples and one or more known synchronization signals, and a signal to noise ratio (SNR) metric. The cell identifier further includes a candidate selection unit operative to receive the correlation metric and SNR metric, and operative to maintain a list of cell candidates, each candidate comprising the correlation and SNR metrics, a cell identification, and a sample time. The controller is operative to add a cell candidate to the list only if the associated SNR metric exceeds a predetermined threshold.

DETAILED DESCRIPTION

Embodiments of the present invention are described herein in the context of cell search and P-SCH detection in LTE. However, the invention is not limited to that technology.

Figure 1:
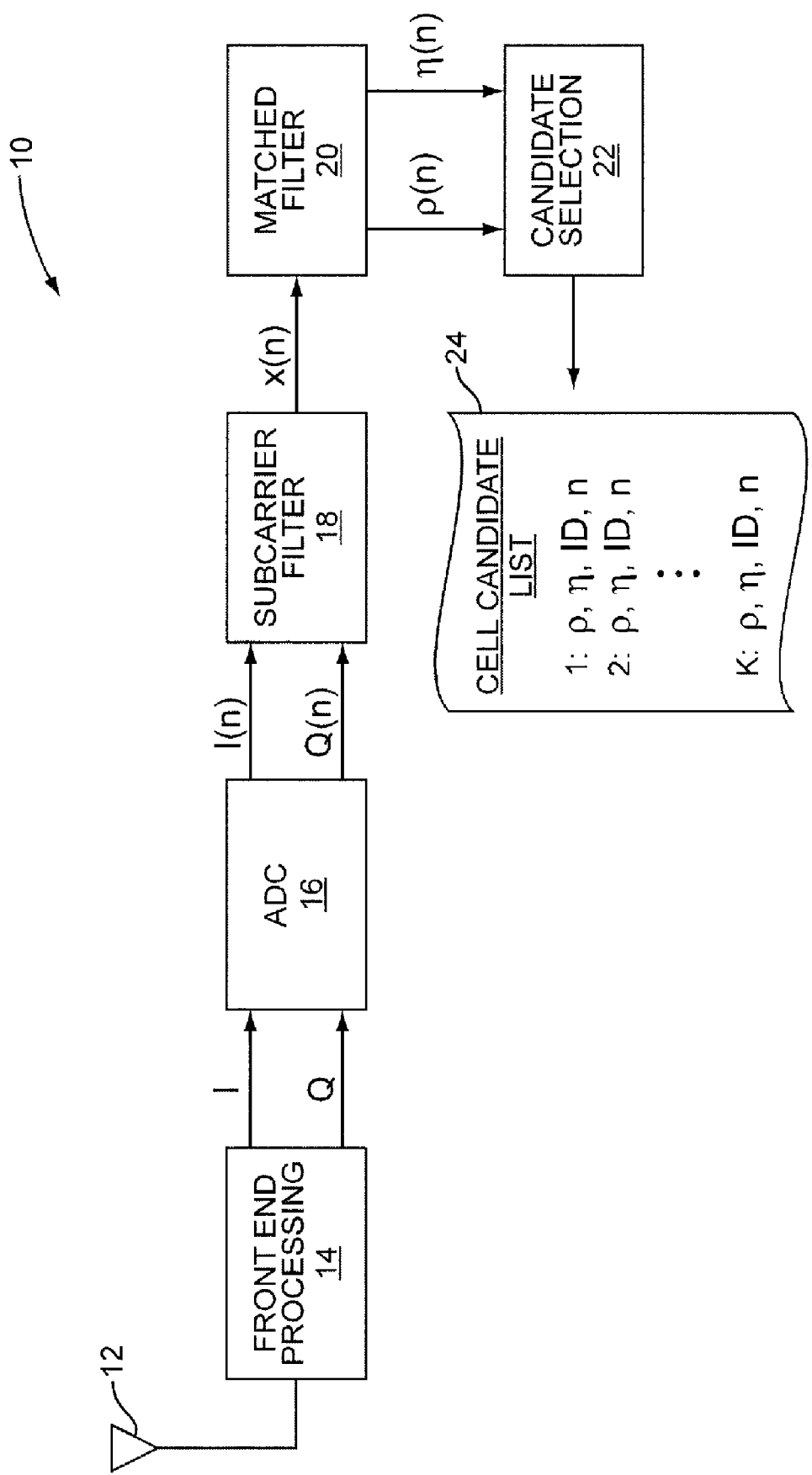
FIG. 1 is a functional block diagram of a receiver according to an embodiment of the present invention.

FIG. 1 depicts a wireless communication system receiver 10. The receiver 10 includes an antenna 12, front end processing circuit 14, analog to digital converter (ADC) 16, subcarrier filter 18, matched filter 20, and candidate selection function 22, and stores a cell candidate list 24 in memory (not shown). The receiver 10 receives, e.g., OFDM signals at one or more antennas 12, and front end processes the signals at 14. As known in the art, front end processing may include low noise amplification, bandpass filtering, downconversion (in one or more steps) to baseband frequency, and separation of in-phase (I) and quadrature (Q) signal components. The I and Q analog component signals are digitized by the ADC 16, yielding sample streams I(n) and Q(n) for successive sampling instances n.

Signal samples are then filtered by the subcarrier filter 18 to pass only the subcarriers that are of interest for the P-SCH detection and candidate selection. Details of the design of the subcarrier filter 18, the sampling rate, and similar parameters may be readily determined, for a particular application, by those of skill in the art, and hence are not further elucidated herein.

The filtered, complex-valued signal stream x(n) (containing P-SCH) is subjected to matched filtering, and the absolute value of the output is squared, forming the correlation metric ρ(n) for that particular sample and set of filter coefficients. At the same time, a ratio η(n) is formed, which is related to the momentary SNR.

Cell candidates are selected in the candidate selection function 22 based on their momentary SNR and correlation metrics, and added to a limited cell candidate list 24. As used herein, the term "limited" cell candidate list means the list has a finite number of entries. A list 24 entry may include, e.g., an identifier (ID), the correlation metric ρ(n), the momentary SNR metric η(n), and the sample time n. In the case of severe interference, such as due to UL transmissions from nearby UEs in the case of TDD, the momentary SNR metric value will be small. Correlation metrics associated with low momentary SNR levels are discarded.

In one embodiment, the duplicative effects of multi-path propagation are minimized by temporal windowing in the candidate selection function 22. In multi-path propagation, the same radio signal from the transmitter will arrive at the UE antenna 12 at multiple instants, due to different propagation path lengths as the signal bounces off of, e.g., buildings, terrain, and the like. In case of a small cell candidate list 24, potentially the whole list 24 may be filled with candidates originating from the same cell due to multi-path propagation. This is avoided in the candidate selection function 22 by defining a temporal window of M sample intervals from the latest addition to the cell candidate list. If a new candidate should be added to the list, based on its correlation and SNR metrics, and it falls within the window, the candidate selection function 22 updates the latest addition to the cell candidate list 24, rather than adding a new candidate. The value M may be chosen as the number of chips corresponding to the (worst case) delay spread expected in the system, which typically is in the order of the length of the cyclic prefix for OFDM.

The selection process is based on dynamic thresholds—comparing the correlation metric associated with each candidate cell identification (with a sufficiently high momentary SNR metric) to those previously selected for inclusion in the list. This means that after processing the whole cell search time interval, the K largest candidates are reported, regardless of the absolute values of their correlation metrics. In this manner, fixed absolute thresholds, which often are sub-optimized, are avoided.

Mathematically, let $\underline{x}(n) = [x(n)\ x(n-1)\ \ldots\ x(n-N+1)]^T$ denote a vector of the last N complex-valued samples received in a receiver 10 at sampling time n, and further $\underline{h}_0 = [h_0\ h_1 \ldots h_{N-1}]^T$ a time-domain representation of length N of P-SCH. In the present context it is not important to which of the three cell identities within the cell group the P-SCH filter 20 belongs.

Assume that $\underline{h}_0$ is unitary such that $\underline{h}_0^H \underline{h}_0 = 1$ (this is just a matter of scaling). Then $\underline{h}_0$ can be considered a unitary basis vector in $\mathbb{C}^N$, and it follows that N−1 other unitary basis vectors $\underline{h}_i$, i=1, 2, ..., N−1 in $\mathbb{C}^N$ can be found that all fulfill:

$$\underline{h}_i^H \underline{h}_j = \begin{cases} 0, & i \neq j \\ 1, & i = j \end{cases} \qquad (1)$$

The exact structure of those unitary basis vectors is not important; only that the property of Equation (1) is true. The additional N−1 basis vectors are only important for the theoretical motivation described below.

Using the above definitions, the matched filtering of $\underline{x}(n)$ can then be expressed as:

$$y(n) = \underline{h}_0^H \underline{x}(n) \qquad (2)$$

where y(n), the filter 20 output, is a complex valued scalar.

The energy contained in the filtered signal is:

$$\rho(n) = |y(n)|^2 = \underline{x}^H(n)\underline{h}_0\underline{h}_0^H\underline{x}(n)$$

The signal prior to filtering can be described in the unitary basis vectors, of which $\underline{h}_0$ is the P-SCH filter in use:

$$\underline{x}(n) = \sum_{i=0}^{N-1} \underline{h}_i (\underline{h}_i^H \underline{x}(n))$$

The energy of the signal prior to filtering may then be expressed as:

$$\underline{x}^H(n)\underline{x}(n) = \left(\sum_{i=0}^{N-1} \underline{h}_i \underline{h}_i^H \underline{x}(n)\right)^H \sum_{j=0}^{N-1} \underline{h}_j \underline{h}_j^H \underline{x}(n)$$

$$= \sum_{i=0}^{N-1}\sum_{j=0}^{N-1} \underline{x}^H(n)\underline{h}_i\underline{h}_i^H \underline{h}_j\underline{h}_j^H \underline{x}(n)$$

$$= \{\text{Eq (1)}\}$$

$$= \sum_{i=0}^{N-1} \underline{x}^H(n)\underline{h}_i\underline{h}_i^H \underline{x}(n)$$

$$= \underline{x}^H(n)\underline{h}_0\underline{h}_0^H \underline{x}(n) + \sum_{i=1}^{N-1} \underline{x}^H(n)\underline{h}_i\underline{h}_i^H \underline{x}(n)$$

$$= |y(n)|^2 + \sum_{i=1}^{N-1} \underline{x}^H(n)\underline{h}_i\underline{h}_i^H \underline{x}(n)$$

It can easily be shown that the ratio of the signal energy captured by the matched filter 20 to the total energy over the same interval is related to the momentary SNR:

$$\eta(n) = \frac{|y(n)|^2}{\underline{x}^H(n)\underline{x}(n)} \qquad (3)$$

$$= \frac{|y(n)|^2}{|y(n)|^2 + \sum_{i=1}^{N-1} \underline{x}^H(n)\underline{h}_i\underline{h}_i^H \underline{x}(n)}$$

$$= \frac{|y(n)|^2 \Big/ \sum_{i=1}^{N-1} \underline{x}^H(n)\underline{h}_i\underline{h}_i^H \underline{x}(n)}{|y(n)|^2 \Big/ \sum_{i=1}^{N-1} \underline{x}^H(n)\underline{h}_i\underline{h}_i^H \underline{x}(n) + 1}$$

$$= \frac{SNR(n)}{SNR(n) + 1}$$

Further manipulation yields the reverse relationship:

$$SNR(n) = \frac{\eta(n)}{1 - \eta(n)} \quad (4)$$

Note that in this discussion, it has been assumed that corner cases are avoided, e.g. when η(n)=0 or η=1. Those cases can easily be trapped and handled accordingly.

By forming the ratio η(n), relative information on the quality of the signal is obtained. This information can be used for discriminating large absolute correlation metrics ρ(n) resulting from interference (e.g., UL transmissions from other UEs in TDD) from those resulting from actual received signals.

Some interference will be captured by the matched filter 20. In the case that the interference can be modeled as complex-valued additive white Gaussian noise, the SNR becomes approximately inversely proportional to the filter length N when no signal is present. Furthermore, since it is the momentary SNR that is utilized, the estimates will fluctuate when no signal is present. This has to be considered when using a threshold for discriminating interference from actual signals. However, the SNR levels in the case of noise-only will not depend on the actual variance of the noise, so even if the variance of the interference is increased several orders of magnitude, the momentary SNR metric will still hover around the same level.

Figure 2:
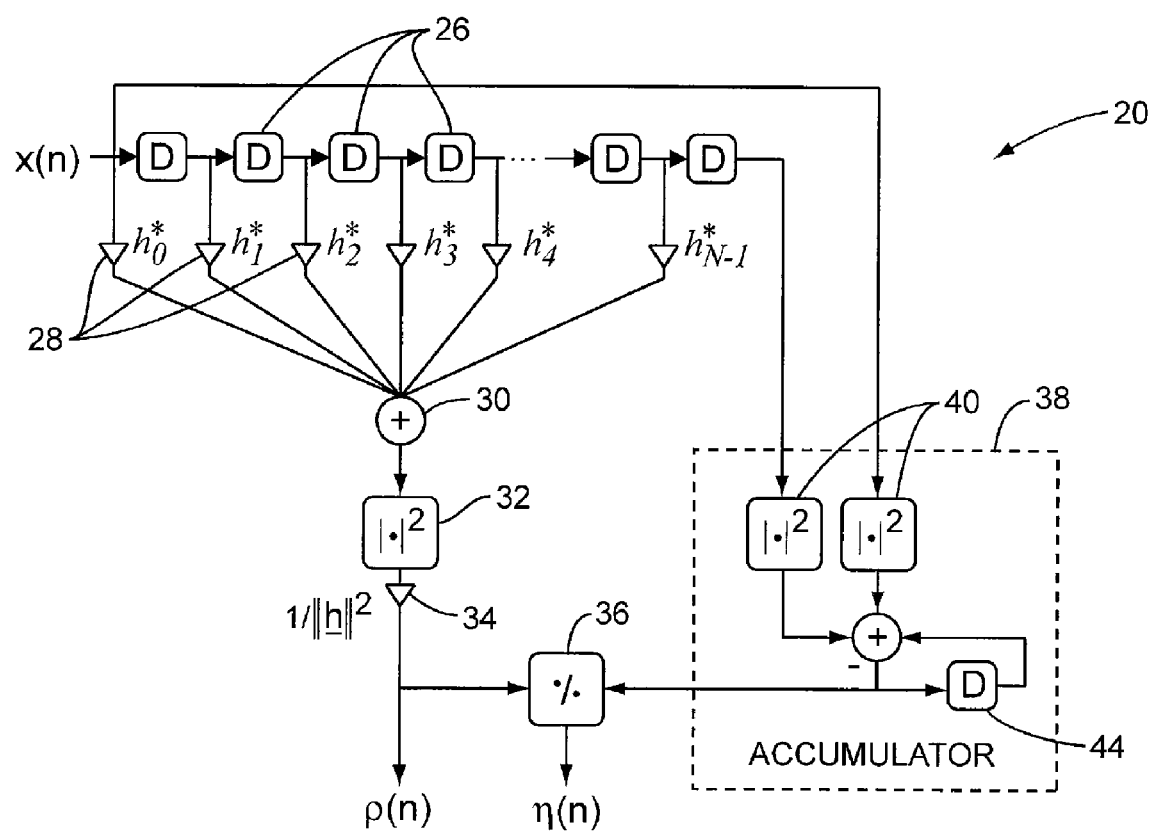
FIG. 2 is a functional block diagram of the matched filter of the receiver of FIG. 1.

FIG. 2 depicts an efficient realization of the matched filter 20 that does not require the norm of the filter h to be unity. Prior to filtering, all states are cleared to zero, and the initial N−1 values are ignored as transient output. The signal sample stream x(n) is delayed by delay elements 26, and tapped off at multipliers 28, which are set to predetermined values. The multiplier 28 outputs are summed by adder 30, and the square of the absolute value determined at function 32. Element 34 is a multiplier that scales, or normalizes, the absolute magnitude filter output, and outputs the correlation metric ρ(n) for sample time n. The scaling prevents the outputs from different implementations of filter 18 (for different cell IDs) generating differently scaled correlation metrics, which would have the effect of favoring some cell IDs over others. In parallel, an accumulator 38 comprising two functions for squared absolute values 40, and adder with three inputs, and a state register (functioning as a delay element) 44, accumulates the energy contained in the samples currently subjected to the matched filter 20. The divider 36 calculates and outputs the SNR metric η(n) according to Equation (3).

The time-domain representation of the matched filter 20 for P-SCH for each of the three cell identities within the group shall be used. However, the actual design of the filter 24 is flexible. For example, in one embodiment, a low-pass filter may be convolved with the matched filter 24 in order to suppress interference from adjacent carriers outside those carrying P-SCH information. In general, those of skill in the art may tailor the filters to achieve better performance under different conditions, given the teachings of the present disclosure.

Figure 3:
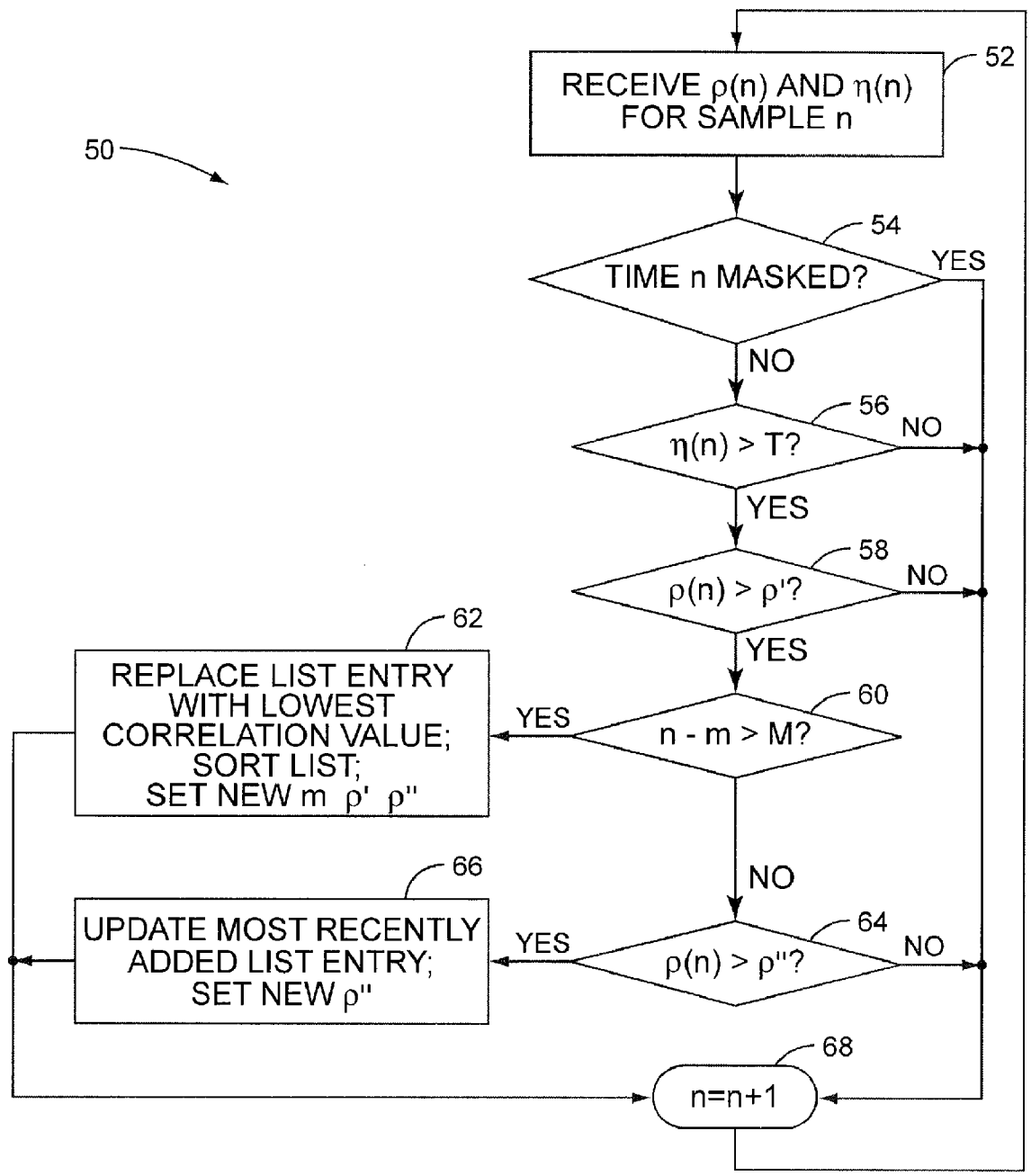
FIG. 3 is a flow diagram of a method of network cell detection according to an embodiment of the present invention.

FIG. 3 depicts a method 50 for cell candidate selection according to one embodiment of the present invention. The method 50 begins at block 52, when the candidate selection function 22 receives a new correlation metric ρ(n) and momentary SNR metric η(n) for sample time n. Initially, the candidate selection function 22 checks whether that particular time n is masked (block 54). Masking can be applied for timings of cells that have already been found in a previous cell search. This prevents already known cells from occupying entries in the cell candidate list, at the expense of weaker cells that have not yet been identified. If the time n is masked, the rest of the method 50 is skipped, n is incremented (block 68), and new correlation and momentary SNR metrics are received (block 52).

Figure 4:
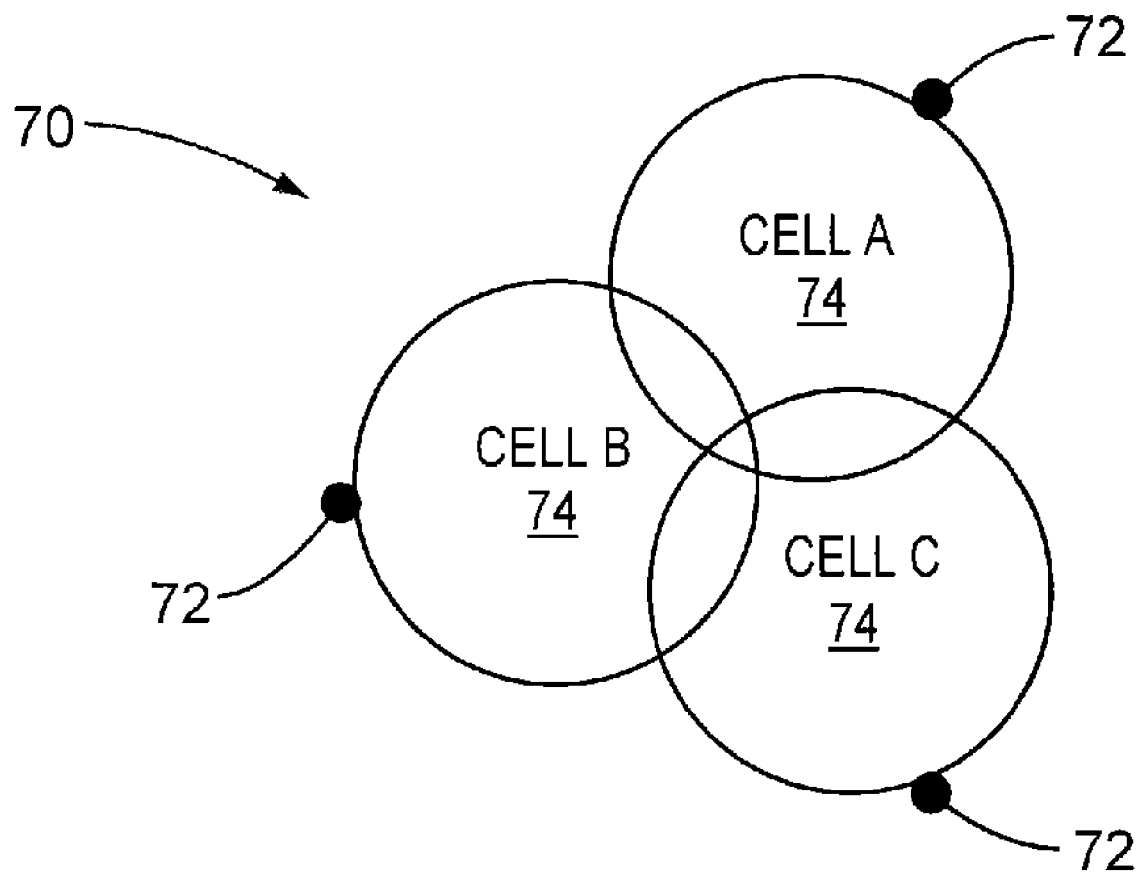
FIG. 4 is a diagram depicting wireless communication cell interference.
Figure 5:
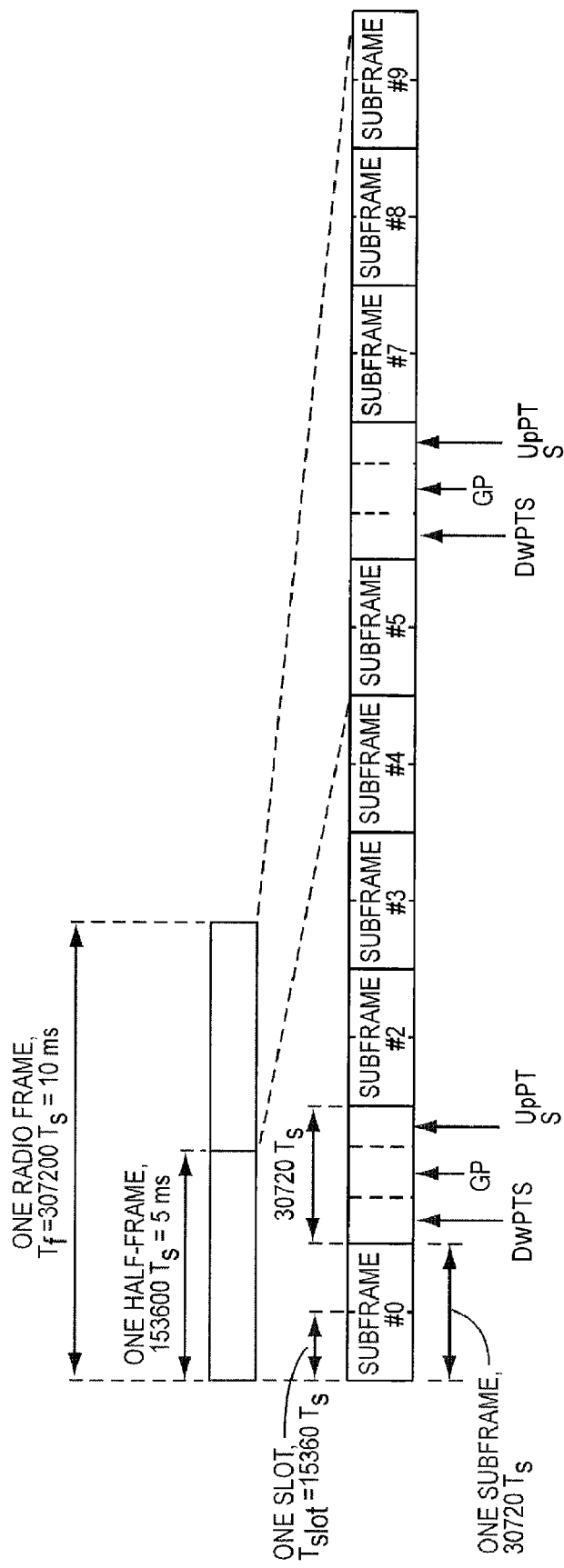
FIG. 5 is a diagram of a TDD frame structure, according to an industry standard.

If the time n is not masked (block 54), the candidate selection function 22 checks whether the momentary SNR metric exceeds a threshold T (block 56). The SNR metric threshold is only needed when visiting a TDD carrier the first time, before the cell synchronization has been established. This includes both Public Land Mobile Network (PLMN) scan and inter-frequency cell search. Only the strongest cell is of primary interest until the synchronization has been established. Referring to FIG. 4, depicting a typical cell coverage pattern 70, the worst location from a cell interference perspective is in the center, where all three cells 74 have similar strength. If only considering the received power from either of the eNBs 72, the SNR would be approximately −3 dB. However, the momentary SNR is determined on a sample basis, and additional interference will result from overlapping multi-path components. Furthermore, depending on the characteristics of the subcarrier filter 18 (see FIG. 1), carriers adjacent to those carrying synchronization signals may contribute additional interference.

The relation between η(n) and the momentary SNR is given in Equations (3) and (4). As a non-limiting example, if it is required that the SNR should be larger than −10 dB for a peak to be included in the P-SCH detection, then from Equation (3), $$T = \frac{10^{-10/10}}{1 + 10^{-10/10}}.$$

Referring again to FIG. 3, if the momentary SNR metric η(n) is below T (block 56), the rest of the method 50 is skipped, n is incremented (block 68), and new correlation and momentary SNR metrics are received (block 52).

If the momentary SNR metric η(n) exceeds T (block 56), the candidate selection function 22 compares the correlation metric ρ(n) against a dynamic threshold ρ' corresponding to the correlation metric for the weakest cell candidate currently included in the list 24 (block 58). If the correlation metric ρ(n) is below ρ' (block 58), the rest of the method 50 is skipped, n is incremented (block 68), and new correlation and momentary SNR metrics are received (block 52).

If the correlation metric ρ(n) exceeds ρ' (block 58), the candidate selection function 22 determines whether a new candidate was added to the list 24 within the last M time instants, as determined from current time n and the stored time m of the last addition to the list 24 (block 60). If not, the candidate selection function 22 replaces the entry in the cell candidate list 24 having the lowest correlation value, with the current (time n) cell candidate (block 62). The parameters m, ρ', and ρ" (described below) are updated (block 62). In particular, m=n, ρ"=ρ(n), the cell candidate list is sorted with respect to the candidates' correlation metrics ρ, and the parameter ρ' is set to the correlation metric for the weakest cell candidate. The sample time n is incremented (block 68), and new correlation and momentary SNR metrics are received (block 52).

If a candidate was added to the list 24 within the last M time instants (block 60), then the candidate selection function 22 compares the correlation metric ρ(n) to the correlation metric value for the most recently added or updated list 24 entry, denoted ρ" (block 64). If ρ(n) exceeds ρ", then the most recently added or updated entry is updated to the parameters for the current candidate (i.e., correlation metric ρ(n), time n, cell (filter) identity, and momentary SNR metric η(n)), and the value of the most recently added peak is updated: ρ"=ρ(n) (block 66). This ensures that entries in the cell candidate list 24 are not displaced by multi-path copies of the signal giving rise to candidate n, but rather, the list entry corresponding to the same signal (within M time intervals) is updated by the current peak, if it is stronger. In this manner, the maximum correlation out of a plurality of multi-path signal copies is captured, without displacing other entries from the cell candidate list 24. The sample time n is then incremented (block 68), and new correlation and momentary SNR metrics are received (block 52).

It is evident from FIG. 3 that most steps of the method 50 can be implemented in parallel, using comparators and a few registers. Each comparator outputs true or false—hence with some additional logic, one can deduce whether an entry shall be added or updated, or whether the algorithm shall go to the next sample.

Although conceptually the cell candidate list 24 is to be sorted, in practice it is sufficient, in one embodiment, to keep track of two cell candidate registers: one having the smallest correlation metric, and the one that was added most recently. This, too, can be handled with low complexity and in parallel using comparators and a few registers. Accordingly, the method 50 may be implemented with low complexity, consuming little silicon area or battery power.

In some embodiments, complexity may be decreased even further, depending on how the algorithms are to be deployed and how much meta-information is to be used in subsequent cell search stages. For example, if the metrics η(n) will not be used once the cell candidate list 24 has been formed, or the ratio can be calculated at low cost at a later stage, then the divider 36 in the matched filter 20, can be removed. Instead, the filter 20 may output ρ(n) and $x^H(n)x(n)$. In this case, the decision η(n)>T? (FIG. 3, block $\overline{56}$) is replaced by ρ(n)>T·$x^H(n)x(n)$? This means that a division is replaced by a multiplication, which is generally a lower-complexity operation. Furthermore, in this case, $x^H(n)x(n)$ may be stored in the cell candidate list 24 instead of $\overline{η(n)}$. Other optimizations will be apparent to those of skill in the art, given the present disclosure, all of which fall within the scope of the present invention, as defined by the claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of wireless communication network cell detection, comprising:
    receiving synchronization signals, each including a cell identification, from the wireless network;
    determining a correlation metric and a momentary signal to noise ratio (SNR) metric of the received synchronization signals by correlating the received synchronization signals with one or more known synchronization patterns; and
    maintaining a list of cell candidates having the highest correlations, that also exceed a predetermined threshold SNR metric.

2. The method of claim 1 wherein determining the correlation metric and the momentary SNR metric by correlating the received synchronization signals comprises filtering I and Q samples of the received signals in a matched filter operative to output a correlation metric and a momentary SNR metric.

3. The method of claim 2 wherein the momentary SNR metric is the ratio:

$$\eta(n) = \frac{SNR(n)}{SNR(n)+1}$$

for sampling time n.

4. The method of claim 2 wherein the momentary SNR metric is derived over the same number of signal samples as a length of the matched filter.

5. The method of claim 1 wherein maintaining a list of cell candidates comprises maintaining a list of only the K cell candidates having the highest correlation metrics.

6. The method of claim 5 wherein maintaining a list of only K cell candidates comprises, when a new candidate is identified having a higher correlation metric than the lowest correlation metric in the correlation list, replacing lowest correlation metric candidate with the new candidate.

7. The method of claim 5 wherein maintaining a list of only K cell candidates comprises, when a new candidate is identified having a higher correlation metric than a candidate added to the list within the last M time instants, updating the last-added candidate in the list with values associated with the new candidate.

8. The method of claim 7 wherein the values associated with the new candidate include a correlation metric, sample time, cell identification, and momentary SNR metric.

9. The method of claim 7 wherein the wireless network is an Orthogonal Frequency Division Multiplexing (OFDM) network, and M is the length of a cyclic prefix prepended to each transmitted symbol.

10. The method of claim 5 further comprising, once the list is full, if a newly discovered cell candidate has a higher correlation metric than the cell candidate in the list with the lowest correlation metric, and the new candidate exceeds the threshold SNR metric, replacing the cell candidate in the list having the lowest correlation metric with the newly discovered cell candidate.

11. The method of claim 5 wherein a received synchronization signal arising from multipath transmission may update an existing list entry but does not replace it.

12. The method of claim 11 wherein a received synchronization signal arising from multipath transmission is determined by a cell candidate associated with the signal having a higher correlation metric than a cell candidate added to the list within the last M time instants.

13. The method of claim 1, further comprising:
    excluding from the list, received signals transmitted in uplink transmissions by a different UE; and
    identifying the cell transmitting the synchronization signals based on a cell candidate selected from the list.

14. The method of claim 13 wherein excluding signals transmitted in uplink transmissions by a different UE comprises excluding from the list received synchronization signals having a momentary SNR metric below a predetermined threshold.

15. A cell identifier for a receiver in user equipment (UE) operative in a wireless communication network, comprising:
    a matched filter operative to receive digitized samples of received synchronization signals, and operative to output a correlation metric indicative of the correlation between the signal samples and one or more known synchronization signals, and a signal to noise ratio (SNR) metric; and a candidate selection unit operative to receive the correlation metric and SNR metric, and operative to maintain a list of cell candidates, each candidate comprising the correlation and SNR metrics, a cell identification, and a sample time, wherein the controller is operative to add a cell candidate to the list only if the associated SNR metric exceeds a predetermined threshold.

16. The cell identifier of claim 15 wherein the candidate selection unit is operative to maintain a maximum of K entries in the cell candidate list, and is further operative to replace an entry in the cell candidate list when a new cell candidate is discovered that has a higher correlation metric.

17. The cell identifier of claim 15 wherein the candidate selection unit is operative to maintain a maximum of K entries in the cell candidate list, and is further operative to update values of a cell candidate added to the list within the last M time instants if a newly discovered cell candidate has a higher correlation metric.

18. The cell identifier of claim 15 wherein the matched filter is operative to calculate the SNR metric over the same number of signal samples as a length of the matched filter.

19. The cell identifier of claim 15 wherein the matched filter is operative to calculate the SNR metric as the ratio:

$$\eta(n) = \frac{SNR(n)}{SNR(n)+1}$$

for sampling time n.

* * * * *